(12) United States Patent
Patel et al.

(10) Patent No.: US 9,350,524 B2
(45) Date of Patent: May 24, 2016

(54) METHOD AND APPARATUS FOR LOCATION BASED CELL RESELECTION AND HANDOVERS

(71) Applicant: MBIT WIRELESS, INC., Newport Beach, CA (US)

(72) Inventors: Bhaskar Patel, San Clemente, CA (US); Sivakumar Govindassamy, San Diego, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 131 days.

(21) Appl. No.: 14/332,547

(22) Filed: Jul. 16, 2014

(65) Prior Publication Data

US 2015/0023190 A1  Jan. 22, 2015

Related U.S. Application Data

(60) Provisional application No. 61/846,620, filed on Jul. 16, 2013.

(51) Int. Cl.
*H04W 4/00* (2009.01)
*H04L 5/14* (2006.01)
*H04W 36/00* (2009.01)
*H04L 5/00* (2006.01)

(52) U.S. Cl.
CPC .............. *H04L 5/14* (2013.01); *H04W 36/0088* (2013.01); *H04L 5/005* (2013.01); *H04L 5/0032* (2013.01)

(58) Field of Classification Search
None
See application file for complete search history.

(56) References Cited

U.S. PATENT DOCUMENTS 8,848,641 B2 *  9/2014  Fong et al. ............ H04W 24/10
                                                      370/329

* cited by examiner

*Primary Examiner* — Frank Duong
(74) *Attorney, Agent, or Firm* — Lerner, David, Littenberg, Krumholz & Mentlik, LLP

(57) ABSTRACT

A method and apparatus are disclosed that enable a client terminal to decode additional information about one or more neighboring cells while maintaining connection with a serving cell. This enables the client terminal to resume the normal user data reception and transmission faster when compared to conventional methods. A result of this is reduced latency and improved user experience under cell reselection or handover conditions, which is especially beneficial for real time services such as voice, video and media streaming.

20 Claims, 5 Drawing Sheets

METHOD AND APPARATUS FOR LOCATION BASED CELL RESELECTION AND HANDOVERS

CROSS-REFERENCE TO RELATED APPLICATIONS

This application claims the benefit of the filing date of U.S. Provisional Application No. 61/846,620 filed Jul. 16, 2013 and entitled "METHOD AND APPARATUS FOR LOCATION BASED CELL RESELECTION AND HANDOVERS," the entire disclosure of which is hereby expressly incorporated by reference herein.

BACKGROUND OF THE INVENTION

As shown in FIG. 1, a wireless communication system 10 comprises elements such as client terminal or mobile station 12 and base stations 14. Other network devices which may be employed, such as a mobile switching center, are not shown. In some wireless communication systems there may be only one base station and many client terminals while in some other communication systems such as cellular wireless communication systems there are multiple base stations and a large number of client terminals communicating with each base station.

As illustrated, the communication path from the base station (BS) to the client terminal direction is referred to herein as the downlink (DL) and the communication path from the client terminal to the base station direction is referred to herein as the uplink (UL). In some wireless communication systems the client terminal or mobile station (MS) communicates with the BS in both DL and UL directions. For instance, this is the case in cellular telephone systems. In other wireless communication systems the client terminal communicates with the base stations in only one direction, usually the DL. This may occur in applications such as paging.

The base station to which the client terminal is communicating with is referred as the serving base station. In some wireless communication systems the serving base station is normally referred as the serving cell. While in practice a cell may include one or more base stations, a distinction is not made between a base station and a cell, and such terms may be used interchangeably herein. The base stations that are in the vicinity of the serving base station are called neighbor cell base stations. Similarly, in some wireless communication systems a neighbor base station is normally referred as a neighbor cell.

Duplexing refers to the ability to provide bidirectional communication in a system, i.e., from base station to client terminals (DL) and from client terminals to base station (UL). There are different methods for providing bidirectional communication. One of the commonly used duplexing method is the Frequency Division Duplexing (FDD). In FDD wireless communication systems, two different frequencies, one for DL and another for UL are used for communication. In FDD wireless communication system, the client terminals may be receiving and transmitting simultaneously.

Another commonly used method is the Time Division Duplexing (TDD). In TDD based wireless communication system, the same exact frequency is used for communication in both DL and UL. In TDD wireless communication systems, the client terminals may be either receiving or transmitting but not both simultaneously. The use of the RF channel for DL and UL may alternate on periodic basis. For example, in every 5 ms time duration, during the first half, the RF channel may be used for DL and during the second half, the RF channel may be used for UL. In some communication systems the time duration for which the RF channel is used for DL and UL may be adjustable and may be changed dynamically.

Yet another commonly used duplexing method is half-duplex FDD (H-FDD). In this method, different frequencies are used for DL and UL but the client terminals may not perform receive and transmit at the same time. Similar to TDD wireless communication system, the client terminal using H-FDD method must periodically switch between DL and UL operation. All three duplexing methods are illustrated in FIG. 2.

In many TDD wireless communication systems, normally the communication between the base station and client terminals is organized into frames as shown in FIG. 3. The frame duration may be different for different communication systems and normally of the order of milliseconds. For a given communication system the frame duration may be fixed. For example, the frame duration may be 5 milliseconds.

In a TDD wireless communication system, the frame is divided into a DL subframe and a UL subframe. In TDD wireless communication systems, the communication from base station to the client terminal (DL) direction takes place during the DL subframe and the communication from client terminal to network (UL) direction takes place during UL subframe on the same RF channel. When a client terminal is powered on, it may not have information about the frame timing of the base station. The client terminal may first perform power scan and select a suitable RF channel for performing synchronization with the base station timing. Therefore, in general the power scan may be performed by the client terminal when its timing is not aligned with that of the base station.

As shown in FIG. 4, client terminal/MS 12 typically contains a baseband subsystem 16 and a radio frequency (RF) subsystem 18. Memory 20, such as an external memory, is shown connected to the baseband subsystem 16. The baseband subsystem 16 normally includes a micro controller unit (MCU) 22, a signal processing unit (SPU) 24, data converters 26, peripherals 28, power management 30, and memory 32 as shown in FIG. 5. The SPU 24 may be a digital signal processor (DSP), hardware (HW) accelerators, co-processors or a combination of the above. Normally the overall control of the baseband subsystem 16 is performed by software running on the MCU 22 and the processing of signals is done by the SPU 24.

SUMMARY OF THE INVENTION

In cellular communication systems the client terminal is required to find a suitable cell to camp on and continue to search for neighbor cells for possible reselection or handover to a better suitable cell. The amount of information required regarding the neighbor cells in preparation for a reselection or handover may vary depending on the particular cellular system.

Provisions are generally made in the cellular system standards to allow the client terminal to be able to search neighbor cells while maintaining link with its current serving cell. The amount of information regarding the neighbor cells that can be decoded may be limited due to the need to maintain the link to the current serving cell. As a result, some of the information regarding the neighbor cell is decoded only after the cell reselection or handover is performed to one of the best suited neighbor cells. After synchronizing with the new serving cell, the client terminal is required to decode the remaining information to enable it to establish and maintain full connection with the new serving cell.

This requirement to decode the additional information regarding the new serving cell after reselection or handover may delay the normal reception and transmission of user data. A method and apparatus are disclosed that enable the client terminal to decode additional information about the neighbor cells while maintaining connection with the serving cell. This enables the client terminal to resume the normal user data reception and transmission faster when compared to the conventional methods. This leads to reduced latency and improved user experience under cell reselection or handover conditions especially for real time services such as voice, video and media streaming.

DETAILED DESCRIPTION

Figure 1:
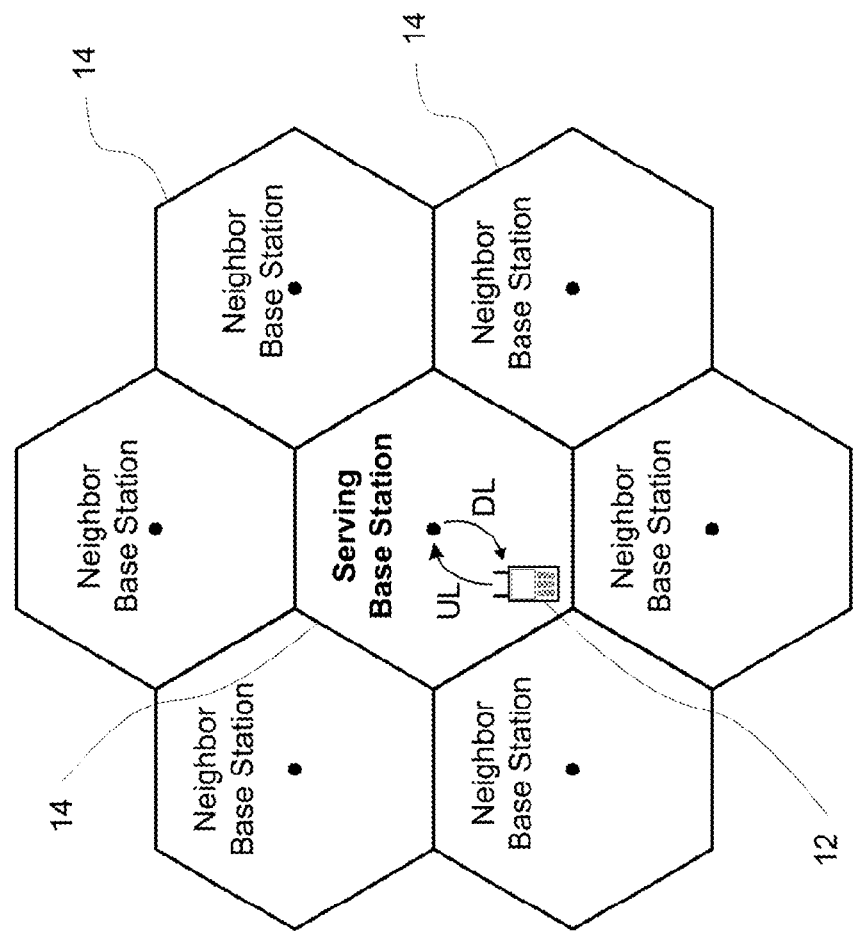
FIG. 1 illustrates a conventional wireless cellular communication system.
Figure 2:
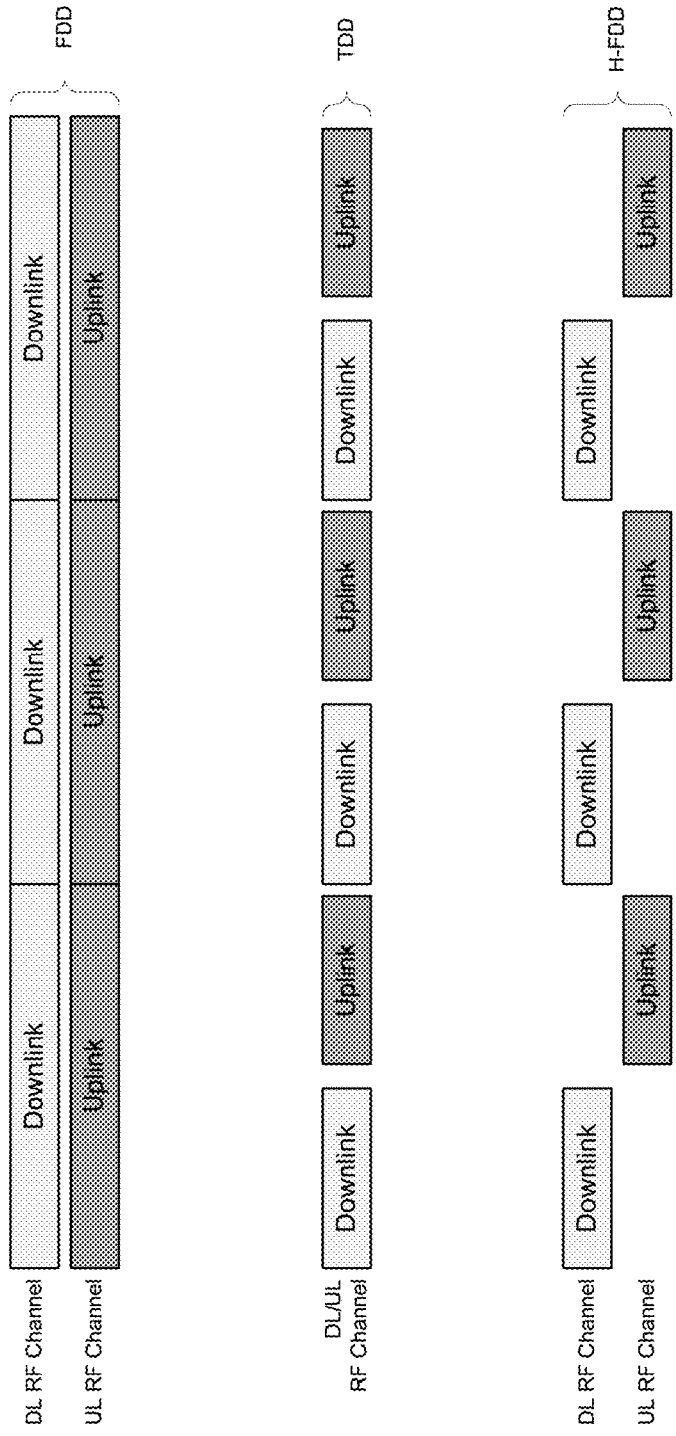
FIG. 2 illustrates three different duplexing techniques commonly used in wireless communication systems.
Figure 3:
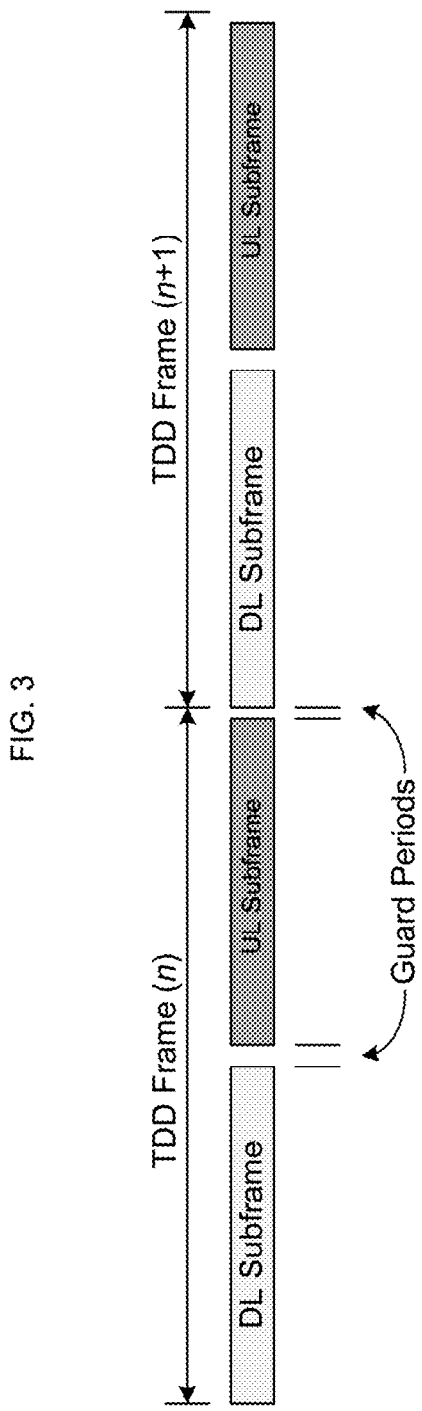
FIG. 3 illustrates the frame structure of a TDD based wireless communication system.

In a cellular communication system, when a client terminal is not engaged in active communication with the base station, it is said to be in "idle" mode. In idle mode the client terminal for the most part may turn off majority of its circuitry to save power. This is often referred to as "sleep" mode, a sub-state within the idle mode. The client terminal remains in sleep mode for long duration and wakes up on the desired time window where it expects to receive the paging messages and certain broadcast messages.

It is important that the client terminal successfully receives and decodes certain broadcast messages and paging messages on the specified time window. The success rate for the incoming calls (e.g., mobile terminated voice calls and/or data calls) in the client terminal is directly related to the successful reception of paging messages. Normally, in idle mode, in addition to the reception of broadcast messages and paging messages, the client terminal continues to search for and monitor the neighbor cells in the current serving frequency (intra frequency neighbor cells), and neighbor cells in other frequencies (inter frequency neighbor cells) and also neighbor cells in inter Radio Access Technologies (RAT) frequencies. The neighbor cells search and monitoring are especially critical when the client terminal is in mobile situations.

There are various criteria defined in different standards based technologies regarding when the client terminal to select the neighbor cell for reselection or idle mode handoff in the idle mode. It is essential to follow these criteria, especially when the client terminal is in a mobile situation, to ensure that the client terminal camps on the appropriate cell to receive service from the network.

When a client terminal is engaged in active communication with a given base station, it is said to be in "connected" mode. In connected mode the client terminal is receiving and transmitting information on a regular and possibly continuous basis. In parallel to normal data reception and transmission, it continues to search for neighbor cells more frequently than in idle mode in order to be prepared for a possible handoff for seamless service. In cellular communication systems, neighbor cell measurements are essential for seamless service in idle and connected modes.

In the 3GPP Long Term Evolution (LTE) wireless communication system, the client terminal is required to measure the Reference Signal Received Power (RSRP) and Reference Signal Received Quality (RSRQ) of the neighbor cells to help make decisions about cell reselections and handovers. For neighbor cells that are using the same frequency as the serving cell, the client terminal can make measurements on neighbor cell while maintaining connection to the serving cell. For neighbor cells that are using the frequency other than the serving cell, the LTE wireless communication system allows a measurement gap to measure the RSRP and RSRQ. For the cell reselection and handover decision purposes, the RSRP and RSRQ provide sufficient information. In case of handovers, once the handover decision is made by the network, it provides the additional information about the target cell (neighbor cell to which handover is being performed) to the user equipment (UE) in its current serving cell. The UE can use this information when transitioning to the target cell.

While the wireless communication network can provide most of the required information about target cell, it cannot provide all the information required by the client terminal to establish and maintain full connection in the target cell. Specifically, the Radio Frame Number (RFN) of the target cell is required for many procedures. One of the important use cases in LTE wireless communication system is the voice services using the Voice over IP (VOIP) protocol based on the Semi-persistent Scheduling (SPS) feature. In SPS, the client terminal need not continuously decode the allocation information; the allocations are made on a semi-persistent basis such that the client terminal can receive and transmit information on a specified Transmission Time Interval (TTI). The determination of the TTI on which the information for a specific client terminal (UE) is to be received or transmitted requires the knowledge of the RFN. Until the RFN is available, normal SPS reception and transmission cannot be started.

Similar to SPS, other procedures require the use of RFN to determine the TTI for reception and transmission of specific information. The Channel State Information (CSI) and Sounding Reference Symbol (SRS) are two other examples of the procedures that require the knowledge of RFN.

The RFN of a cell is included by the base station in the Master Information Block (MIB), which is transmitted over the Physical Broadcast Channel (PBCH). In a conventional method, the client terminal performs the handover based on the RSRP and RSRQ information. Then, after transitioning to the target cell, the client terminal decodes the MIB of the target cell to extract the RFN.

A method and apparatus are disclosed that enable the client terminal to decode the MIB of the neighbor cell while maintaining the connection with the serving cell. This in turn enables the client terminal to resume the full connection with the new serving cell after handover. The client terminal uses the timing information from the RSRP and RSRQ measurements to schedule the decoding of the MIB.

According to an aspect of the present invention, the client terminal, while receiving the serving cell signals for user payload data, in parallel schedules the filtering of the incoming signal to a predetermined bandwidth, e.g., a 1.4 MHz bandwidth, and reduced sample rate. According to an aspect of the present invention the actual scheduling of the reception and filtering of the signal is done based on the timing information from RSRP and RSRQ measurements. Note that the RSRP and RSRQ measurements require the detection of Primary Synchronization Sequence (PSS) and Secondary Synchronization Sequence (SSS). The PSS and SSS detection provides the physical cell identity and timing information about the cell.

While the timing of the start of a radio frame of a neighbor cell is known based on PSS and SSS, the actual RFN of the frame is not known. The decoding of the MIB requires the knowledge of the RFN since the scrambling code used for MIB encoding itself is a function of the RFN. This in turn requires blind decoding of the scrambling phase of the MIB.

Figure 6:
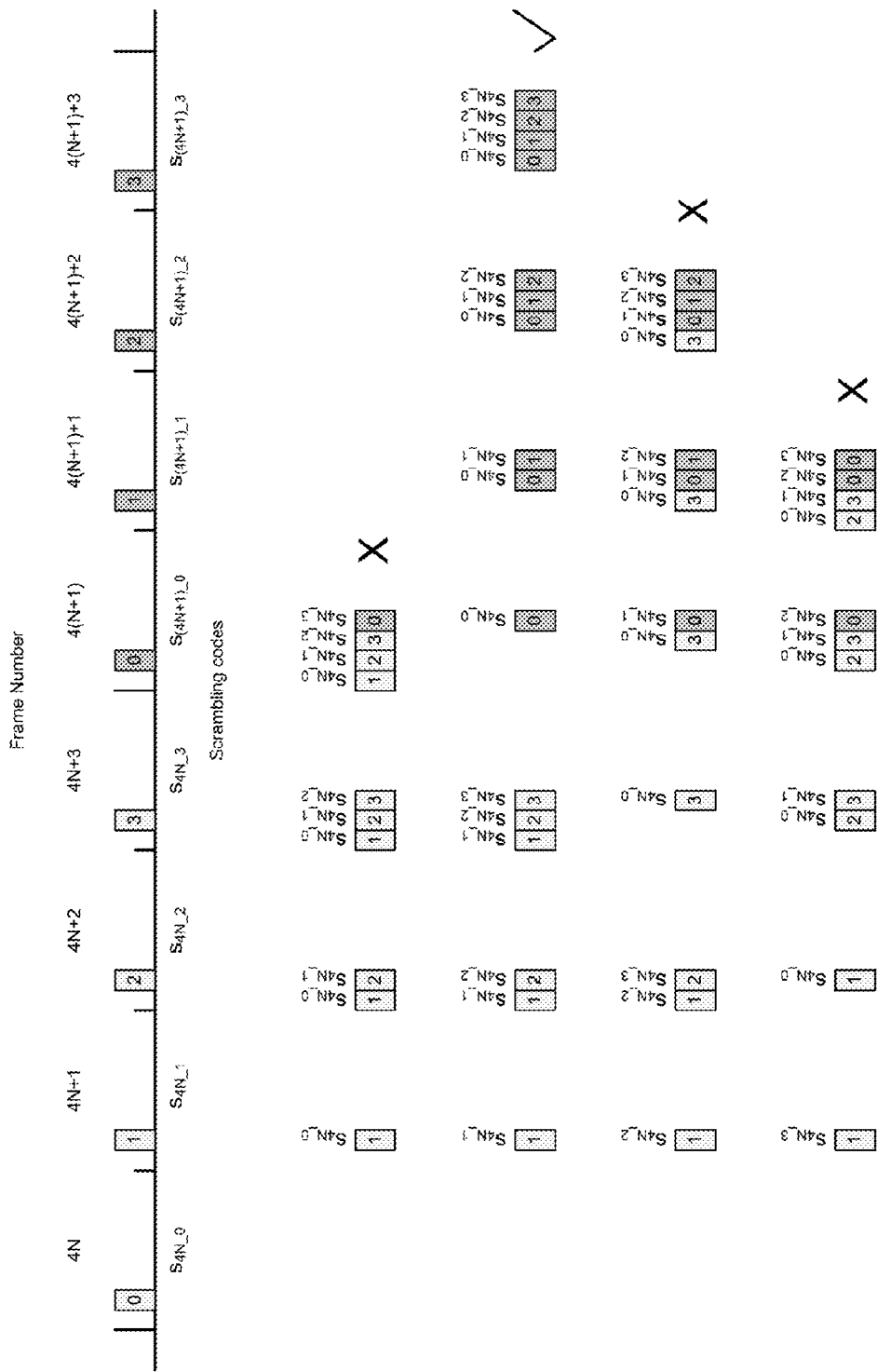
FIG. 6 illustrates example success and failure scenarios for neighbor cell Master Information Block ("MIB") decode while the mobile station is connected to the serving cell in accordance with the aspects of the present invention.

According to an aspect of the present invention, blind decoding of the neighbor cell MIB is performed while maintaining the full connection to the current serving cell. According to an aspect of the present invention, the blind decoding attempts are scheduled for a maximum of up to seven times. FIG. 6 shows an example sequence of events that are followed to enable the blind decoding of the neighbor cell MIB. The same encoded MIB payload with different scrambling phases is transmitted over four consecutive frames starting with RFN % 4=0. In order to combine one or more of the MIB instances constructively, the scrambling phase of each instance must be known, which is a function of the RFN. For fast decoding of the MIB multiple hypotheses for scrambling phase are attempted in parallel as shown in FIG. 6. In the worst case scenario, latency of up to seven frames may occur for MIB decoding.

According to another aspect of the invention, the Viterbi decoder used for Physical Downlink Control Channel (PDCCH) decoding of the serving cell is time shared with the neighbor cell MIB decoding. According to another aspect of the invention, the soft bit buffers for the PDCCH decoding and the neighbor cell MIB decoding are maintained separately to enable the combining over multiple neighbor cells MIB instances.

According to another aspect of the invention, the neighbor cell MIB decoding may be triggered only when the RSRP and/or RSRQ reporting criteria is met.

According to another aspect of the invention, the neighbor cell MIB decoding may be triggered as and when the neighbor cell is detected and the relative timing of the neighbor cell with respect to the serving cell is identified. According to another aspect of the invention, in order to detect new neighbor cells, the neighbor PSS, SSS, RSRP and/or RSRQ measurements are given priority over neighbor cell MIB decoding.

Figure 5:
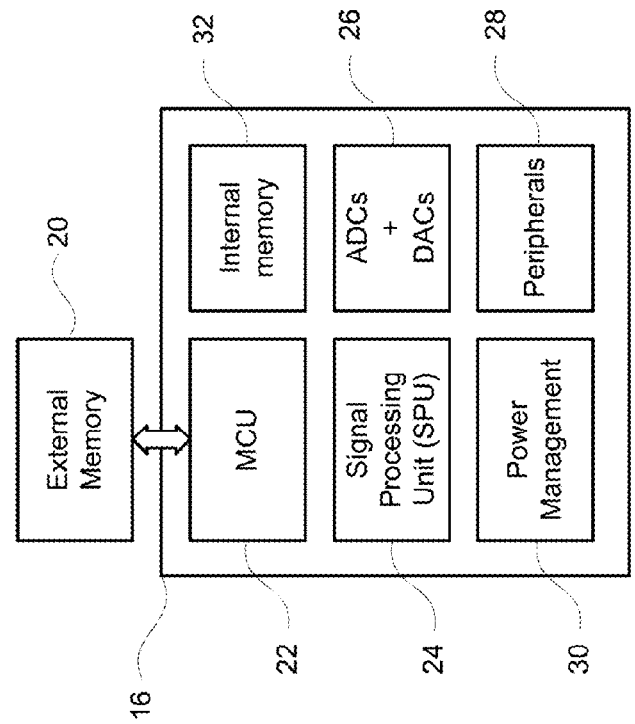
FIG. 5 illustrates a baseband subsystem for a wireless mobile station.
Figure 4:
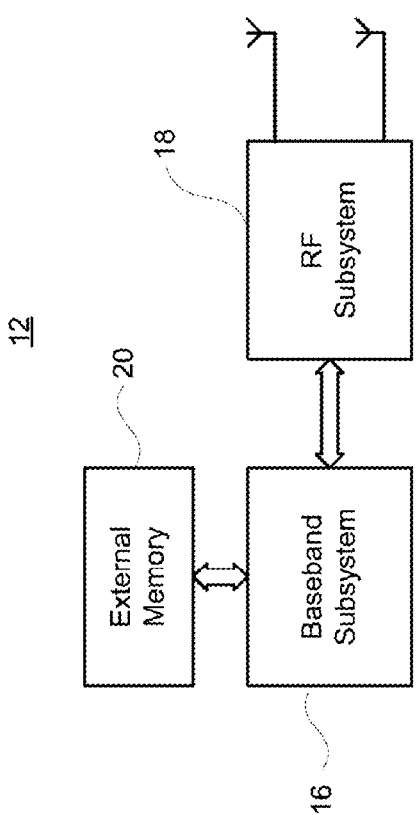
FIG. 4 illustrates a wireless mobile station diagram.

Aspects of the present invention may be implemented in firmware of the MCU or the SPU of the baseband subsystem 16 as shown in FIG. 5. In another alternative, aspects of the present invention may also be implemented as a combination of firmware and hardware of the baseband subsystem 16. For instance, one or more processors of the baseband subsystem may execute instructions to perform the foregoing processes.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Aspects of each embodiment may be employed in the other embodiments described herein.

The invention claimed is:

1. A method of decoding additional neighbor cell information while maintaining a connection with a serving cell, the method comprising:
    receiving, at a client device, serving cell signals for user payload data from a current serving cell;
    detecting, by one or more processors, a primary synchronization sequence (PSS) and a secondary synchronization sequence (SSS) of a neighbor cell;
    measuring, by the one or more processors, timing information of reference signal received power (RSRP) and reference signal received quality (RSRQ) of one or more selected cells according to the detected PSS and SSS of the neighbor cell;
    scheduling, by the one or more processors, filtering of the received serving cell signals to a predetermined bandwidth and a reduced sample rate, the scheduling correlating to the timing information of the RSRP and RSRQ of the neighbor cell; and
    performing, by the one or more processors, blind decoding of a master information block (MIB) of the neighbor cell while maintaining connection to the current serving cell, the blind decoding extracting a scramble phase of the MIB to identify a radio frame number of the neighbor cell.

2. The method of claim 1, wherein the predetermined bandwidth is on the order of 1.4 MHz.

3. The method of claim 1, wherein the blind decoding of the MIB is performed using a maximum of seven attempts.

4. The method of claim 1, wherein performing the blind decoding includes combining multiple instances of the MIB constructively.

5. The method of claim 1, wherein multiple hypotheses for extracting the scramble phase are attempted in parallel.

6. The method of claim 1, wherein a Viterbi decoder used for Physical Downlink Control Channel (PDCCH) decoding of the serving cell is time shared with the blind decoding of the MIB.

7. The method of claim 6, wherein soft bit buffers for the PDCCH decoding and the blind decoding of the MIB are maintained separately to enable combining over multiple neighbor cell MIB instances.

8. The method of claim 1, wherein the blind decoding of the MIB is triggered only when predetermined criteria of one or both of the RSRP and RSRQ of the neighbor cell are met.

9. The method of claim 1, wherein the blind decoding of the MIB is triggered when the neighbor cell is detected and relative timing between the neighbor cell and the serving cell is identified.

10. The method of claim 1, wherein, to detect one or more new neighbor cells, measurements of one or more of the PSS, SSS, RSRP and RSRQ are given priority over the blind decoding of the MIB.

11. A processing system to perform decoding of additional neighbor cell information while maintaining a connection with a serving cell in a wireless communication network, the processing system comprising:
    one or more computing devices configured to:
        receive serving cell signals for user payload data from a current serving cell;
        detect a primary synchronization sequence (PSS) and a secondary synchronization sequence (SSS) of a neighbor cell;
        measure timing information of reference signal received power (RSRP) and reference signal received quality (RSRQ) of one or more selected cells according to the detected PSS and SSS of the neighbor cell;

schedule filtering of the received serving cell signals to a predetermined bandwidth and a reduced sample rate, the scheduling correlating to the timing information of the RSRP and RSRQ of the neighbor cell; and perform blind decoding of a master information block (MIB) of the neighbor cell while maintaining connection to the current serving cell, the blind decoding extracting a scramble phase of the MIB to identify a radio frame number of the neighbor cell.

12. The processing system of claim 11, wherein the blind decoding of the MIB is performed using a maximum of seven attempts.

13. The processing system of claim 11, wherein performing the blind decoding includes combining multiple instances of the MIB constructively.

14. The processing system of claim 11, wherein multiple hypotheses for extracting the scramble phase are attempted in parallel by the one or more computing devices.

15. The processing system of claim 11, further comprising a Viterbi decoder, wherein:

the Viterbi decoder is configured to perform Physical Downlink Control Channel (PDCCH) decoding of the serving cell; and the PDCCH decoding is time shared with the blind decoding of the MIB.

16. The processing system of claim 15, further comprising memory that is configured to separately store soft bit buffers for the PDCCH decoding and the blind decoding of the MIB to enable combining over multiple neighbor cell MIB instances.

17. The processing system of claim 11, wherein the blind decoding of the MIB is triggered only when predetermined criteria of one or both of the RSRP and RSRQ of the neighbor cell are met.

18. The processing system of claim 11, wherein the blind decoding of the MIB is triggered when the neighbor cell is detected and relative timing between the neighbor cell and the serving cell is identified.

19. The processing system of claim 11, wherein, to detect one or more new neighbor cells, measurements of one or more of the PSS, SSS, RSRP and RSRQ are given priority over the blind decoding of the MIB.

20. A client device configured to communicate in a wireless network, including to perform decoding of additional neighbor cell information while maintaining a connection with a serving cell of the wireless network, the client device comprising:

one or more computing devices configured to:

receive serving cell signals for user payload data from a current serving cell;

detect a primary synchronization sequence (PSS) and a secondary synchronization sequence (SSS) of a neighbor cell;

measure timing information of reference signal received power (RSRP) and reference signal received quality (RSRQ) of one or more selected cells according to the detected PSS and SSS of the neighbor cell;

schedule filtering of the received serving cell signals to a predetermined bandwidth and a reduced sample rate, the scheduling correlating to the timing information of the RSRP and RSRQ of the neighbor cell;

perform blind decoding of a master information block (MIB) of the neighbor cell while maintaining connection to the current serving cell, the blind decoding extracting a scramble phase of the MIB to identify a radio frame number of the neighbor cell.

\* \* \* \* \*